United States Patent [19]
Nader et al.

[11] Patent Number: 4,890,522
[45] Date of Patent: Jan. 2, 1990

[54] CLAMPING HEAD FOR THE RELEASABLE ATTACHMENT OF A WORKPIECE CARRIER TO A MACHINE TOOL SPINDLE

[75] Inventors: Hans Nader, Stockerau; Karl Steiner, Vienna, both of Austria

[73] Assignee: Maschinenfabrik Heid Aktiengesellschaft, Stockerau, Austria

[21] Appl. No.: 173,728

[22] Filed: Mar. 25, 1988

[30] Foreign Application Priority Data

Mar. 25, 1987 [DE] Fed. Rep. of Germany ... 8704411[U]

[51] Int. Cl.[4] .............................................. B23B 19/02
[52] U.S. Cl. ......................................... 82/142; 82/165
[58] Field of Search ........ 82/28 R, 30, 40 R, DIG. 6, 82/142, 165; 409/219; 29/563, 33 P, 568; 279/41 R, 43, 46 R, 50; 198/345, 346.1, 803.1; 269/64

[56] References Cited
U.S. PATENT DOCUMENTS

| 3,504,583 | 4/1970 | Harman | 82/40 R |
| 3,520,050 | 7/1970 | Trebble | 29/568 |
| 3,545,075 | 12/1970 | Ollearo | 29/568 |
| 4,102,035 | 7/1978 | Voglrieder et al. | 29/568 |
| 4,662,043 | 5/1987 | Stone et al. | 29/33 P |

FOREIGN PATENT DOCUMENTS

| 3235820 | 7/1983 | Fed. Rep. of Germany | 82/30 |
| 3528443 | 3/1986 | Fed. Rep. of Germany | |

Primary Examiner—James G. Smith
Assistant Examiner—Jack W. Lavinder
Attorney, Agent, or Firm—Herbert Dubno

[57] ABSTRACT

Axially displaceable shifters on the stock of a machine tool around the spindle serve to actuate clamps against the force of respective spring stacks to release a workpiece carrier whose pins are engaged by the clamps, thereby keeping the main spindle passage free from obstruction in a system for the quick-change replacement of workpieces on the respective workpiece carrier.

4 Claims, 3 Drawing Sheets

CLAMPING HEAD FOR THE RELEASABLE ATTACHMENT OF A WORKPIECE CARRIER TO A MACHINE TOOL SPINDLE

FIELD OF THE INVENTION

Our present invention relates to a clamping head for the releasable attachment of a workpiece carrier, such as a pallet chuck, face plate or the like, to the spindle of a machine tool and, more particularly, to an arrangement which allows the rapid attachment and detachment of the workpiece carrier and the spindle.

BACKGROUND OF THE INVENTION

In general, a workpiece may be attached to a spindle of a machine tool, rotatably mounted in a housing for stock, e.g. the head stock of a lathe, by affixing a chuck, face plate or collet to the spindle and clamping the workpiece between the jaws of the chuck, within the releasing structure of the collet or onto the plate or a pallet or workpiece carrier which can be so engaged or can be substituted for the face plate.

Rapid removal and replacement of the workpiece is important since much time can be lost if each workpiece must be unclamped and a new workpiece clamped in place on the machine directly.

Accordingly, it is desirable to provide the machine with a quick-change capacity for a workpiece.

German open application DE-OS No. 35 28 443, for example, describes a coupling for the releasable attachment of a workpiece carrier to a machine tool utilizing a number of clamps and within a receptable into which the workpiece carrier can fit. The clamps are located around the receptacle for the workpiece carrier and about the axis along a circle and have hook-like members movable radially with respect to the axis.

The clamps engage in an annular groove of the workpiece carrier in the coupling position and lock the workpiece carrier in place while a planar array of teeth or serrations, such as a Hirth crown of teeth on the carrier and the receptacle and lock into engagement to transfer torque between the workpiece and the receptacle.

The actuation of the clamps is effected by a complex system of shifting rods and pivotal levers through an actuating system which traverses the main spindle so that the passage normally provided in the main spindle is obstructed and cannot be used for other purposes.

OBJECTS OF THE INVENTION

The principle object of our present invention is to provide a clamping head for the releasable attachment of a workpiece carrier to the rotatable spindle of a machine tool which avoids drawbacks of the earlier system as described.

Another object of this invention is to provide a simple and reliable system for the rapid release and attachment of a workpiece carrier to a machine tool spindle which does not obstruct the passage through the main spindle of the machine.

SUMMARY OF THE INVENTION

These objects and others which will become apparent hereinafter are attained, in accordance with the invention in that on the machine housing side, especially in the stock in which the spindle is journaled, a slider is provided which is displaceable relative to and is juxtaposed with the clamping head, this slider having a stem or rod which, in its actuated position, engages a shiftable part of the clamping head to displace the latter against a spring-generated counterforce to release the clamp aligned with this rod or stem.

The clamping members on the clamping head thus are biased by respective spring forces, into their clamping positions to engage projecting elements on the workpiece carrier and draw the Hirth serrations of the latter against the Hirth serrations on the clamping head.

The fluid-operated actuator on the spindle stock can be a hydraulically or pneumatically-actuated cylinder connected to the stem or rod for displacing it with a force sufficient to compress the spring stack in the clamping head associated with the respective clamp to open the latter. The workpiece carrier, such as a pallet or mounting plate can then be removed.

More specifically, the apparatus for securing the workpiece to the rotatable spindle comprises:

a clamping head mounted on the spindle and having a surface lying generally in a plane perpendicular to an axis of rotation of the spindle and formed with an annular array of serrations surrounding the axis;

a plurality of clamps spaced apart around the axis, each having an axially displaceable member biased by respective spring means for urging the respective member into a clamping position;

a workpiece carrier adapted to receive a workpiece to be machined on the machine tool and provided with respective axially extending elements positioned for engagement in the respective clamps and retention against the clamping head under the action of the spring means, the workpiece carrier having an annular array of serrations mating with the serrations of the clamping head for transmission of torque between the clamping head and the workpiece carrier; and respective actuators on the stock having shifters engageable with the members in at least one predetermined relative position of the spindle and the stock for displacing the members against the forces of the respective spring means axially to release the elements from the respective clamps.

The shifters are, as noted, most advantageously stems and the serrations can be arrays of Hirth teeth.

Preferably the members are each provided with claw-like clamp jaws and are spaced apart along a circle centered on the axis, the elements being pins respectively engageable in the jaws of the respective clamp, the spring means of each clamp including a stack of spring disks acting upon the respective member.

Advantageously, the pins have surfaces engaged by the jaws of the respective clamp which diverge toward the clamping head.

The clamping head can have an inwardly extending underhang engaging in an undercut of a respective cylinder for taking up reaction force when the cylinder is pressurized with the medium to displace the respective piston, thereby relieving the spindle of the force.

Each of the members can be provided with at least one signal pin projecting on the clamping head to an extend indicating whether the respective clamp is engaged or disengaged, and at last one switch is provided on the stock and is responsive to the signal pin.

The jaws of the clamps can exert an axial force drawing the Hirth serrations against one another.

One or more workpieces can have previously been clamped on each workpiece carrier. The replacement of a workpiece carrier is effected rapidly and, while a workpiece on one pallet or mounting plate is being machined, a previously removed mounting plate can have the previously machined workpiece dismounted therefrom and another raw workpiece mounted thereon. Naturally, in place of mounting plates, chucks in which a workpiece has previously been clamped, can be used.

The machine tool thus represents a high efficiency unit of a machining facility.

An important advantage of the invention is that the clamping structures on the head affixed to the main spindle are only passive elements, i.e. elements like spring stacks which do not require an energy source traversing the main spindle. Hence the passage of the main spindle need not be obstructed by levers or actuators for the clamps.

The positions and state of the clamps, i.e. the clamping and open positions thereof can be signalled with ease utilizing the signal pin as described and, for example, limit switches so that effective and reliable indication of the functional state of the clamps can be provided.

Because the clamping head may have an inward projection of hook shape along its jaw to engage behind the spindle stock or in a groove thereof, the force applied to the clamping head by the fluid-operated stems can be transferred in a closed-force path back to the spindle stock, thereby preventing overloading of the main spindle. The clamps themselves can be radially movable claws engageable in undercuts of the workpiece carrier and control the stems.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
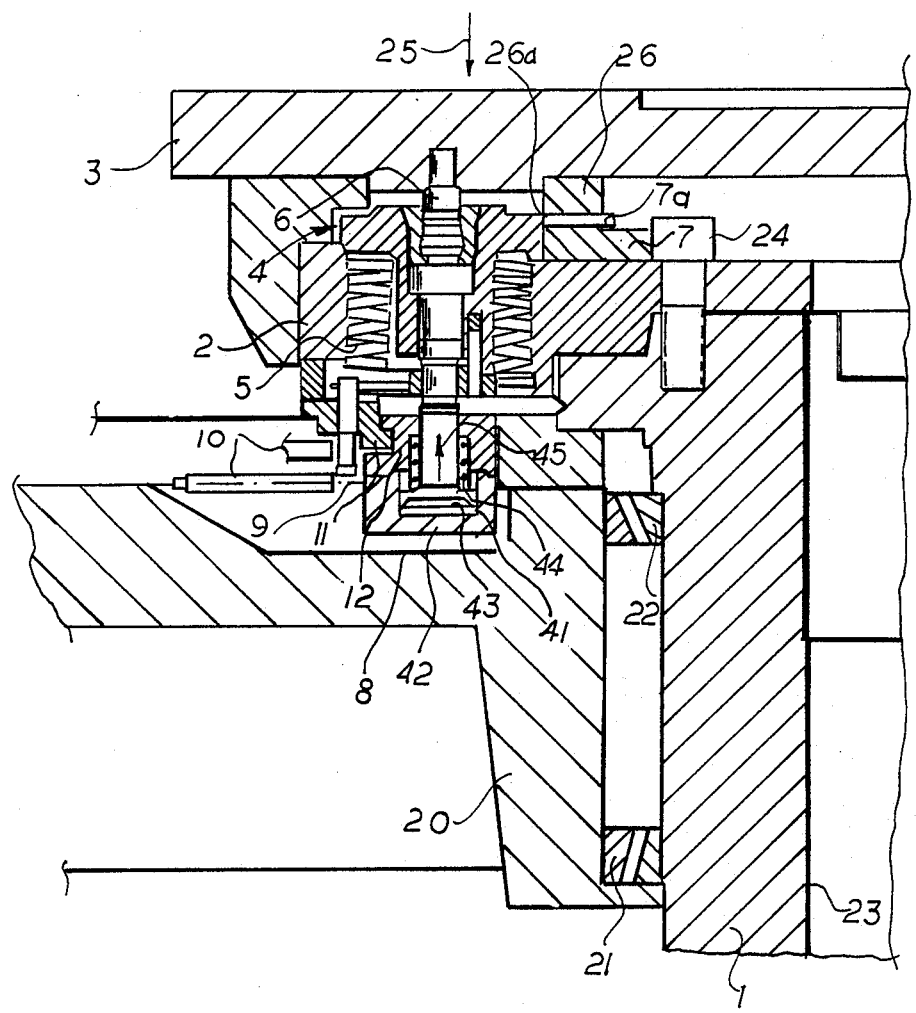
FIG. 1 is a fragmentary axial cross-sectional view through a portion of the main spindle of a machine tool showing the apparatus of the invention.
Figure 2:
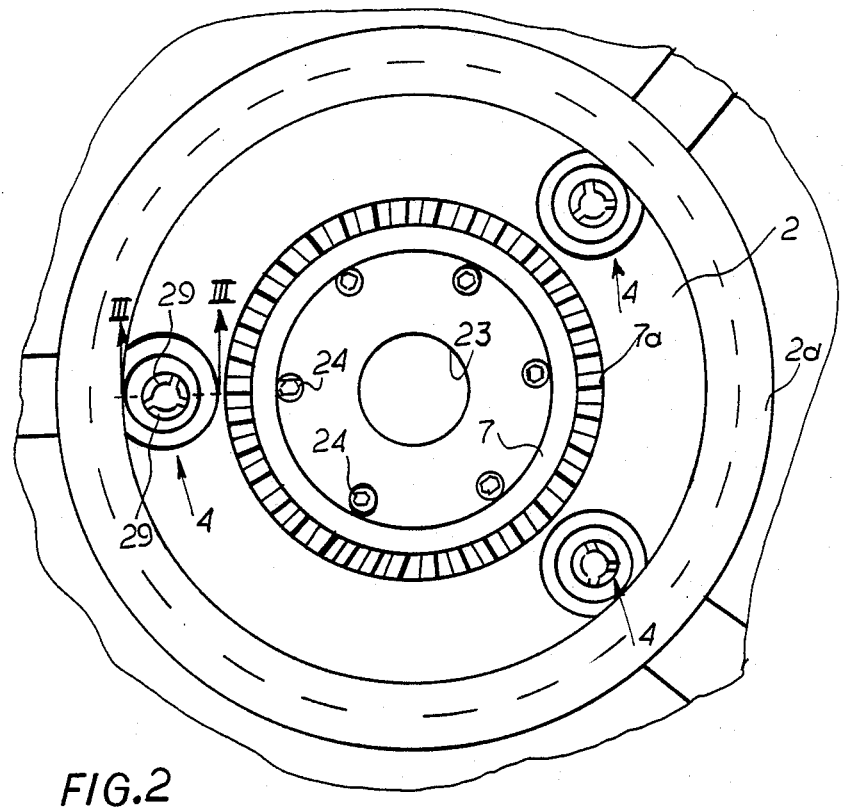
FIG. 2 is an end view of the clamping head according to the invention.

In the drawing, we have shown a main spindle 1 which is journaled in the head stock 20 of the machine tool, e.g. a lathe, by bearings 21 and 22 and which has a central passage 23 which, according to the invention, can remain unobstructed.

A clamping head, 2 is affixed to the main spindle by bolts 24 to receive a workpiece carrier in the form of a holding plate or pallet 3 rather than serving to clamp or retain the workpiece directly. The workpiece, in turn, is secured to the plate 3.

For the releasable attachment of the carrier 3 to the clamping head 2, the clamping head is provided with a plurality of angularly-spaced clamps 4 disposed along a circle centered on the axis of the main spindle.

Each of the clamps 4 is biased by a spring stack 5 made up of dished-disk spring washers, which can also be described as Belleville washers.

The clamps 4 (of which three in number have been shown) engage respective holding elements represented as pins 6 projecting axially from the pallet 3.

Because the clamps and the pins 6 engage at frustoconical surfaces of the pins, the radial clamping engagement by the clamps 4 of these pins generates an axial force in the direction of arrow 25 to press the workpiece carrier against the clamping head 2.

The surface of the clamping head 2 turned toward the workpiece carrier 3 is provided with a ring 7 carrying an array of Hirth serrations 7a, the workpiece carrier 3 being provided with a ring 26 of mating Hirth serrations 26a so mating sets of Hirth teeth effect torque transmission between the clamp head 2 and the plate 3.

The spring stacks 5 retain the clamps closed against the respective pin 6.

Figure 3:
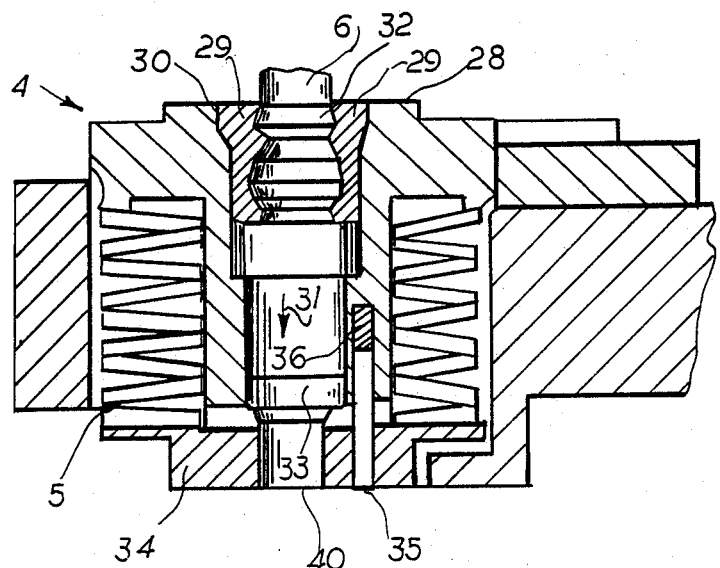
FIG. 3 is a detail cross section taken along the line III—III of FIG. 2.

Referring now to FIG. 3 in which one of the three clamps 4 has been illustrated in detail section, it can be seen that the spring stack 5 is seated against the clamp housing 28 in which three clamp jaws 29 can be axially displaced relative to a frustoconical seat 30 which, when the jaws are urged in the direction of arrow 31, press the jaws radially against the frustoconical surface 32 of the respective pin 6. The jaws are axially displaced in the housing 28 by a tappet 33 which is fixed to a spring seat 34 against which the spring stack 5 is braced. Rotation of the seat 34 is prevented by a guide pin 35 extending into a bore 36 in the housing 28.

Thus when the spring seat 34 and the tappet 33 are displaced in the opposite direction, i.e. the direction of arrow 40, the spring 50 will be compressed and the jaws 29 moved upwardly relative to the housing 28, thereby spreading outwardly and releasing the pin 6.

Figure 3A:
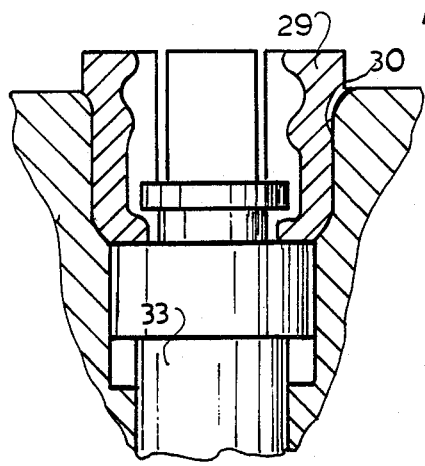
FIG. 3A is a detail cross sectional view showing the jaws in their open position and the tappet in its upper position.
Figure 3B:
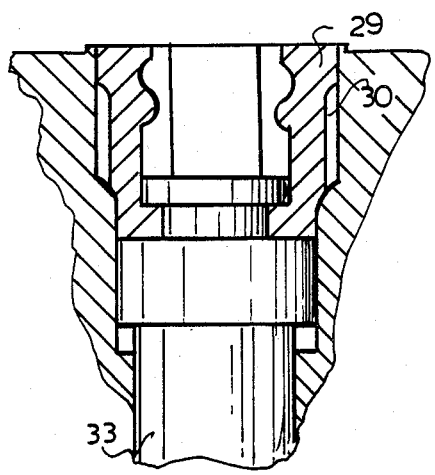
FIG. 3B is a view similar to FIG. 3A showing the tappet in its lower position and the jaws closed.

This will be more readily apparent from FIGS. 3A and 3B which show a portion of the device of FIG. 3 drawn to a larger scale. In the elevated position of the tappet 33 (FIG. 3A) the jaws 29 are open whereas in the retracted position of the tappet 33 (FIG. 3B), the jaws are in a closed position.

Conversely, when the force tending to hold the stack 5 in its more compressed set is relieved, i.e. the force of the actuator is relaxed, the spring stack 5 will drive the spring seat 34 and the tappet 33 in the direction of arrow 31 to clamp the pin 6 in the jaws 29 and exert the aforementioned force in the direction of arrow 25 on the workpiece carrier.

As is also apparent from FIG. 1, the stock 20 is provided with cylinders 41 in a ring 42 secured to the stock and receiving pistons 43 acting against springs 44. The cylinders, which can be hydraulically or pneumatically pressurized to drive the pistons 43 in the direction of arrows 45, carry stems or rods 8 which are the shifters previously mentioned.

These shifters 8 can be axially aligned with the tappets 33 in predetermined relative angular positions of the spindle and the stock so that the force necessary to compress the spring stacks and release the workpiece carrier can be generated.

The apparatus of the invention operates as follows:

For workpiece replacement, the main spindle is positioned in one of the aforementioned angular predetermined positions in which the stem axes of the stems 8 are aligned with the axes of the clamps 4.

The cylinders are hydraulically and pneumatically pressurized and the stems 8 thereby driven in the direction of arrows 45 to compress the spring stacks 5 and release the pins 6 of the holding plate 3.

The holding plate 3 with its machined workpiece is then easily removed and replaced by a holding plate 3 carrying an unmachined workpiece. The replacement is reduced thereby to a simple change of one pallet for the other.

Upon such replacement, the stems 8 are relieved so that the spring stacks 5 can cause the claw-like gripper jaws 29 to engage the pins 6 of the new pallet and draw the Hirth teeth of the latter into engagement with the Hirth teeth of the clamping head 2.

The mounting of a new workpiece is thus effected without material loss in machining time and replacement of the workpiece can be effected in a significantly shorter time than is required for clamping a workpiece. Of course, the system can be simplified further if the means on the plate 3 for engaging a workpiece is a chuck capable of rapid engagement with and release from a workpiece.

The setting of the clamps 4 is signaled by pins 9 which are carried by the plate 34 and project toward the stock 20 more closely when the clamp is engaged than when the clamp is in a disengaged state. The position of the pins 9 may be signaled by limit switches 10, for example, Reed switches, which can be actuated by the pin 9.

Finally it should be apparent that the clamping head 2 has a radially inwardly-projecting nose formation 11 which can engage in an undercut 12 on the ring 42 and hence on the stock.

The nose 11 and the undercut are braced against one another axially for a workpiece change when the force of the pistons 43 are applied axially to the clamping head 2 via the spring stacks. This relieves any force upon the main spindle resulting from the workpiece change operation by the closed force path within each clamping system.

The clamps 4 operate passively, i.e. there is no need for energy supply via pipelines or the like in the main spindle so that the passage 23 remains available for other purposes. The remote signaling by pin 9 and the switches 10 of the status of each clamp during the workpiece-changing operation represents a simple control of the reliability of the system.

Of course, more than three clamps 4 can be provided around the ring 7 and each clamp can have two jaws or more than three jaws if desired.

We claim:

1. An apparatus for securing a workpiece to a rotatable spindle journaled in a stock of a machine tool, a central hollow passage being formed within said spindle, said apparatus comprising:

a clamping head mounted on said spindle and having a surface lying generally in a plane perpendicular to an axis of rotation of said spindle and formed with an annular array of serrations surrounding said axis;

a plurality of clamps spaced apart around said axis, each having an axially displaceable member biased by respective spring means for urging the respective member into a clamping position;

a workpiece carrier adapted to receive a workpiece to be machined on said machine tool and provided with respective axially extending elements positioned for engagement in the respective clamps and retention against said clamping head under the action of said spring means, said workpiece carrier having an annular array of serrations mating with the serrations of said clamping head for transmission of torque between said clamping head and said workpiece carrier; and respective actuators on said stock having shifters engageable with said members in at least one predetermined relative position of said spindle and said stock for displacing said members against the forces of the respective spring means axially to release said elements from the respective clamps, said shifters being stems aligned with axes of said members in said predetermined position, said serrations being arrays of Hirth teeth, said members each being provided with claw-like clamp jaws and are spaced apart along a circle centered on said axis, said elements being pins respectively engageable in the jaws of the respective clamp, said spring means of each clamp including a stack of spring disks acting upon the respective member, said stems each being provided with a respective piston displaceable by a fluid medium and received in a respective cylinder on said stock, said pins having surfaces engaged by the jaws of the respective clamp which diverge toward said clamping head, said clamping head having an inwardly extending underhang engaging in an undercut of a respective cylinder for taking up reaction force when said cylinder is pressurized with said medium to displace the respective piston, thereby relieving said spindle of said force, and said members being provided with at least one signal pin projecting on said clamping head to an extend indicating whether the respective clamp is engaged or disengaged, at least one switch being provided on said stock and responsive to said signal pin.

2. The apparatus defined in claim 1 wherein said switch is a limit switch.

3. An apparatus for securing a workpiece to a rotatable spindle journaled in a stock of a machine tool, a central hollow passage being formed within said spindle, said apparatus comprising:

a clamping head mounted on said spindle and having a surface lying generally in a plane perpendicular to an axis of rotation of said spindle and formed with an annular array of serrations surrounding said axis;

a plurality of clamps spaced apart around said axis, each having an axially displaceable member biased by respective spring means for urging the respective member into a clamping position;

a workpiece carrier adapted to receive a workpiece to be machined on said machine tool and provided with respective axially extending elements positioned for engagement in the respective clamps and retention against said clamping head under the action of said spring means, said workpiece carrier having an annular array of serrations mating with the serrations of said clamping head for transmission of torque between said clamping head and said workpiece carrier; and respective actuators on said stock having shifters engageable with said members in at least on predetermined relative position of said spindle and said stock for displacing said members against the forces of the respective spring means axially to release said elements from the respective clamps, said members being provided with at least one signal pin projecting on said clamping head to an extend indicating whether the respective clamp is engaged or disengaged, at least one switch being provided on said stock and responsive to said signal pin.

4. The apparatus defined in claim 3 wherein said switch is a limit switch.

* * * * *